(12) United States Patent
Fukui (10) Patent No.: US 8,831,392 B2
(45) Date of Patent: Sep. 9, 2014

(54) LIGHTING USING NATURAL LIGHT

(75) Inventor: Toshimi Fukui, Ohtsu (JP)

(73) Assignee: Empire Technology Development LLC, Wilmington, DE (US)

( * ) Notice: Subject to any disclaimer, the term of this patent is extended or adjusted under 35 U.S.C. 154(b) by 251 days.

(21) Appl. No.: 13/320,733

(22) PCT Filed: May 27, 2011

(86) PCT No.: PCT/US2011/038439
§ 371 (c)(1),
(2), (4) Date: Nov. 15, 2011

(87) PCT Pub. No.: WO2012/166103
PCT Pub. Date: Dec. 6, 2012

(65) Prior Publication Data
US 2012/0307515 A1 Dec. 6, 2012

(51) Int. Cl.
*G02B 6/00* (2006.01)
*G02B 6/10* (2006.01)
*G02B 5/00* (2006.01)
*F21K 2/00* (2006.01)
*G02F 1/1335* (2006.01)
*F21V 8/00* (2006.01)

(52) U.S. Cl.
CPC .............. *G02B 6/0001* (2013.01); *G02B 5/003* (2013.01); *G02F 2001/133614* (2013.01); *F21K 2/00* (2013.01); *F21V 2008/00* (2013.01); *Y10S 385/90* (2013.01)
USPC ............ 385/131; 385/129; 385/147; 385/900

(58) Field of Classification Search
CPC .................. G02B 6/0001; G02B 5/003; G02F 2001/13614; F21K 21/00; F21V 2008/00
USPC ................... 362/1, 2, 209, 557, 576
See application file for complete search history.

(56) References Cited

U.S. PATENT DOCUMENTS

| | | | | |
|---|---|---|---|---|
| 4,070,763 A | * | 1/1978 | Carts, Jr. | 42/132 |
| 4,152,752 A | * | 5/1979 | Niemi | 362/576 |
| 4,297,000 A | * | 10/1981 | Fries | 362/557 |
| 4,422,719 A | * | 12/1983 | Orcutt | 385/123 |
| 4,539,625 A | * | 9/1985 | Bornstein et al. | 362/576 |
| 4,626,068 A | * | 12/1986 | Caldwell | 385/128 |
| 4,799,748 A | * | 1/1989 | Brown | 385/31 |
| 4,884,860 A | | 12/1989 | Brown | |

(Continued)

FOREIGN PATENT DOCUMENTS

| | | |
|---|---|---|
| GB | 2029883 A | 3/1980 |
| JP | 2000-000407 A | 1/2000 |

OTHER PUBLICATIONS

Saito, M. et al., "Full-color illumination that needs no electric power", Optics Express, Feb. 19, 2007, vol. 15, No. 4, pp. 1621-1626.

(Continued)

*Primary Examiner* — Rhonda Peace
(74) *Attorney, Agent, or Firm* — Maschoff Brennan (57) ABSTRACT

Embodiments described herein generally relate to re-using the energy of natural light. In some examples, a lighting unit is described. An example lighting unit can include a multiple number of bound light-conductive members. A long-lasting phosphorescent material can be dispersed between the multiple number of bound light-conductive members. A luminance of the lighting unit can be at least several thousand cd/m².

21 Claims, 7 Drawing Sheets

(56) References Cited

U.S. PATENT DOCUMENTS

| | | | | |
|---|---|---|---|---|
| 4,961,617 | A | * | 10/1990 | Shahidi et al. ............... 385/31 |
| 5,548,490 | A | * | 8/1996 | Smith et al. ................ 362/557 |
| 5,708,741 | A | * | 1/1998 | DeVeau ........................ 385/49 |
| 5,709,456 | A | * | 1/1998 | Smith et al. .................. 362/84 |
| 5,956,854 | A | * | 9/1999 | Lorocco ........................ 42/132 |
| 6,010,644 | A | * | 1/2000 | Fu et al. ................ 252/301.4 R |
| 6,059,438 | A | * | 5/2000 | Smith et al. ................ 362/583 |
| 6,130,781 | A | | 10/2000 | Gauvin |
| 6,261,477 | B1 | * | 7/2001 | Fu et al. ................ 252/301.4 R |
| 6,272,265 | B1 | * | 8/2001 | Franklin ........................ 385/31 |
| 6,284,156 | B1 | * | 9/2001 | Uehara et al. .......... 252/301.4 F |
| 6,287,993 | B1 | * | 9/2001 | Fu et al. ............................ 501/5 |
| 6,301,418 | B1 | * | 10/2001 | Freier et al. .................. 385/123 |
| 6,784,603 | B2 | * | 8/2004 | Pelka et al. .................. 313/113 |
| 6,843,590 | B2 | * | 1/2005 | Jones et al. .................. 362/554 |
| 7,058,103 | B2 | * | 6/2006 | Ishida et al. ............... 372/43.01 |
| 7,229,203 | B2 | * | 6/2007 | Lath ............................. 362/576 |
| 7,520,651 | B2 | * | 4/2009 | Lath ............................. 362/576 |
| 7,547,128 | B2 | * | 6/2009 | Lath ............................. 362/576 |
| 7,676,981 | B2 | * | 3/2010 | Buckingham et al. .......... 42/132 |
| 7,688,400 | B1 | * | 3/2010 | Schellhorn et al. ............. 349/65 |
| 7,688,401 | B2 | * | 3/2010 | Schellhorn et al. ............. 349/65 |
| 7,771,070 | B2 | * | 8/2010 | Tarlton ............................ 362/34 |
| 7,988,324 | B2 | * | 8/2011 | Lath ............................. 362/231 |
| 8,287,760 | B2 | * | 10/2012 | Ishida et al. ............ 252/301.4 R |
| 8,408,725 | B1 | * | 4/2013 | Maxik et al. ..................... 362/84 |
| 8,425,063 | B2 | * | 4/2013 | Buckingham et al. ........... 362/34 |
| 8,463,092 | B2 | * | 6/2013 | Farahi ............................. 385/34 |
| 2002/0085393 | A1 | * | 7/2002 | Eisenman et al. ............ 362/576 |
| 2003/0012533 | A1 | * | 1/2003 | Steiner et al. ................ 385/121 |
| 2003/0095776 | A1 | * | 5/2003 | Saito et al. ................... 385/137 |
| 2004/0011997 | A1 | * | 1/2004 | Rogers et al. .......... 252/301.4 F |
| 2004/0022071 | A1 | * | 2/2004 | Cheng et al. ................. 362/557 |
| 2004/0105481 | A1 | * | 6/2004 | Ishida et al. ................. 372/108 |
| 2005/0052882 | A1 | * | 3/2005 | Lath ............................. 362/551 |
| 2006/0104081 | A1 | * | 5/2006 | Fraval ........................... 362/557 |
| 2007/0014096 | A1 | * | 1/2007 | Hulse ................................ 362/2 |
| 2007/0103924 | A1 | * | 5/2007 | Lath ............................. 362/551 |
| 2007/0258261 | A1 | * | 11/2007 | Lath ............................. 362/551 |
| 2007/0263411 | A1 | * | 11/2007 | Schellhorn et al. ........... 362/615 |
| 2007/0263967 | A1 | * | 11/2007 | Lath ............................. 385/115 |
| 2009/0067194 | A1 | * | 3/2009 | Sanchez ........................ 362/618 |
| 2009/0257242 | A1 | * | 10/2009 | Wendman ..................... 362/553 |
| 2009/0296018 | A1 | * | 12/2009 | Harle et al. ...................... 349/61 |
| 2009/0302237 | A1 | * | 12/2009 | Bortz et al. ................. 250/473.1 |
| 2009/0310347 | A1 | * | 12/2009 | Lath ............................. 362/231 |
| 2010/0066254 | A1 | * | 3/2010 | Ott et al. ....................... 315/129 |
| 2010/0124243 | A1 | * | 5/2010 | Hussell et al. ............. 372/45.01 |
| 2010/0188839 | A1 | * | 7/2010 | Li ..................................... 362/84 |
| 2011/0138639 | A1 | * | 6/2011 | Kingsley et al. ................ 33/228 |
| 2011/0232211 | A1 | * | 9/2011 | Farahi .......................... 52/173.3 |
| 2011/0269358 | A1 | * | 11/2011 | Peng et al. ...................... 442/59 |
| 2012/0299032 | A1 | * | 11/2012 | Li ................................... 257/89 |
| 2012/0307515 | A1 | * | 12/2012 | Fukui ........................... 362/556 |
| 2013/0133744 | A1 | * | 5/2013 | Etienne et al. ................ 136/259 |
| 2013/0155643 | A1 | * | 6/2013 | Meyer et al. ...................... 362/2 |

OTHER PUBLICATIONS

Saito, M. et al.,"Bright afterglow illuminator made of phosphorescent material and fluorescent fibers," Applied Optics, Aug. 20, 2000, vol. 39, No. 24, pp. 4366-4371.

Faludi, "Storing Daylight", http://www.worldchanging.com/archives/008632.html, Originally published Apr. 2007, republished Sep. 17, 2008, accessed Aug. 27, 2010.

Lee, Evelyn, Cold Light—Fiberoptic lamp brings sunlight indoors, http://inhabitat.com/cold-light-fiberoptic-lamp-shines-sunlight-indoors/, dated Feb. 26, 2007, accessed Nov. 14, 2011.

"About acrylic product," accessed at http://web.archive.org/web/20111130203553/http://www.ikedapura.com/akuriru.html, accessed on Feb. 19, 2014, pp. 1-3.

"Process for producing a 435 times FRP," accessed at http://web.archive.org/web/20130531023945/http://koza.misumi.jp/mold/2009/11/435_frp_1.html, Nov. 20, 2009, pp. 1-2.

International Search Report and Written Opinion for counterpart International Application No. PCT/US2011/038439, mailed on Sep. 14, 2011.

* cited by examiner

LIGHTING USING NATURAL LIGHT

BACKGROUND

Unless otherwise indicated herein, the materials described herein are not prior art to the claims in the present application and are not admitted to be prior art by inclusion in this section.

Rooms in many homes include windows that allow natural light from the sun to be used for lighting during the day time. During the night time, however, natural light from distant stars and/or from the sun that has been reflected off of the moon is typically insufficient to provide adequate illumination for many activities in a home. Accordingly, many homes include a lighting system that may be operated as needed in the day time and/or night time for illumination.

A variety of lighting systems have been implemented in homes and other buildings to provide illumination in addition to or in place of that provided by the sun. Many of the lighting systems currently used in homes require a relatively large amount of operating energy which is often supplied by non-renewable energy resources. As such, the carbon footprint of many homes is significant.

SUMMARY

Some embodiments disclosed herein generally relate to re-using the energy of natural light.

In some examples, a lighting unit is described that can include a multiple number of bound light-conductive members. A long-lasting phosphorescent material can be dispersed between the multiple number of bound light-conductive members. A luminance of the lighting unit can be at least several thousand candela per square meter ($cd/m^2$).

In some examples, methods of forming a lighting unit are described that can include forming a textured surface on at least one side of a light-conductive member. The methods can also include depositing a layer of long-lasting phosphorescent material on the textured surface of the light-conductive member to form a combined layer. The methods can also include binding a multiple number of combined layers together.

In some examples, a system for storing and re-using the energy of natural light is described that can include a light collector. The system may also include a lighting unit optically coupled to the light collector. The lighting unit can include a multiple number of bound light-conductive members. A long-lasting phosphorescent material can be dispersed between the multiple number of bound light-conductive members. A luminance of the lighting unit can be at least several thousand $cd/m^2$.

In some examples, methods for storing and re-using energy of natural light are described that can include collecting natural light from the sun at a light collector. The methods can also include storing energy from the natural light in a lighting unit optically coupled to the light collector. The methods can also include emitting the stored energy as light to provide illumination.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein relate generally to lighting units, systems and methods for re-using the energy of natural light and methods for making such lighting units. An example lighting unit can include multiple light-conductive members and a long-lasting phosphorescent material dispersed between the light-conductive members. An example system can include a light collector and a lighting unit optically coupled to the light collector.

Natural light from the sun or other source can be collected by the light collector and directed into the light-conductive members of the lighting unit. Some of the natural light directed into the light-conductive members can be stored as energy. In particular, some of the incoming natural light can impinge on the long-lasting phosphorescent material dispersed between the light-conductive members. The impinging light can excite the long-lasting phosphorescent material from a relatively lower energy state to a relatively higher energy state.

Subsequently, the stored energy can be emitted from the lighting unit as light to provide illumination. For instance, the long-lasting phosphorescent material can decay from a relatively higher energy state to a relatively lower energy state and thereby emit one or more photons.

Example embodiments may also include forming a lighting unit by first forming a textured surface on at least one side of a light-conductive member. The textured surface may be a stepped surface. A layer of long-lasting phosphorescent material can be deposited on the textured surface of the light-conductive member to form a combined layer. Multiple combined layers can then be bound together.

Figure 1:
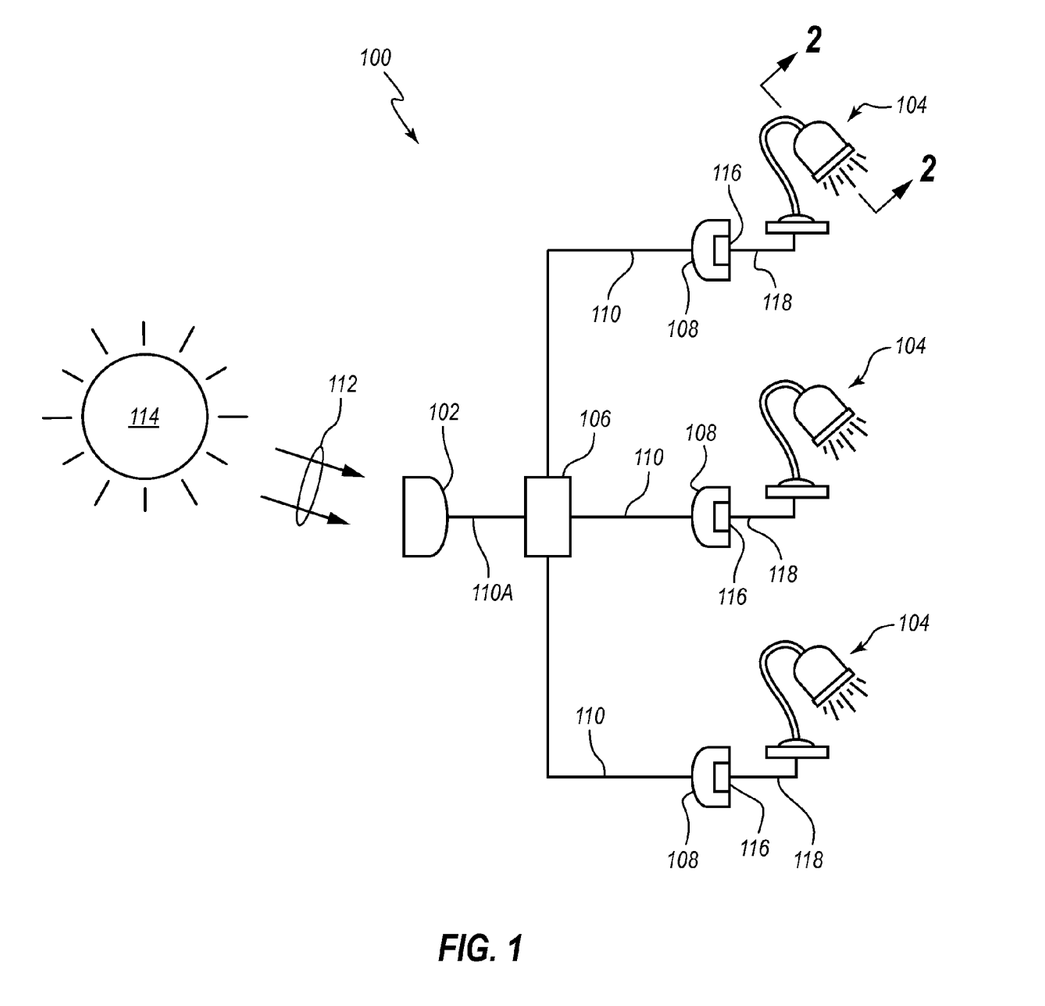
FIG. 1 is a diagram of an example system for storing and re-using energy of natural light.

FIG. 1 is a diagram of an example system 100 for storing and re-using energy of natural light, arranged in accordance with at least some embodiments described herein. The system 100 includes a light collector 102 and one or more lighting units 104 optically coupled to the light collector 102. Optionally, the system 100 may further include a light distributor 106, one or more sockets 108, and one or more optical waveguides 110, including an optical waveguide 110A.

The light collector 102 is configured to collect natural light 112 from a light source 114, such as the sun. While FIG. 1 depicts the light collector 102 collecting direct sunlight, the light collector 102 may alternately or additionally collect reflected sunlight, or other natural light. Moreover, the principles disclosed herein are not limited to the storage and re-use of the energy of natural light, but may alternately or additionally be applied to the storage and re-use of the energy of artificial light, such as street lights, or other electromagnetic radiation.

Accordingly, the light collector 102 may be positioned on a roof, exterior wall, or other portion of a house, building or structure for exposure to natural light 112 that can be collected by the light collector 102. The light collector 102 may have any suitable configuration for collecting natural light. For instance, the light collector 102 may include a light condensing unit such as are marketed by the Himawari company of Japan as the 12-eye Sunflower condensing unit (XD-50S/12AS type) and 36-eye Sunflower condensing unit (XD-100S/36AS type). In these and other embodiments, the light collector 102 may include a lens array and/or other optical elements configured to collect natural light 112 at an end of the optical waveguide 110A so that the collected natural light 112 can be received into the optical waveguide 110A. Alternately or additionally, the light collector 102 may include a tracking mechanism configured to track relative movement of the light source 114.

Each of the lighting units 104 is optically coupled to the light collector 102. Each lighting unit 104 may be configured to store energy from natural light 112 collected by the light collector 102 and to emit stored energy as light. In some embodiments, for instance, each lighting unit 104 may include a long-lasting phosphorescent material having an excitation spectrum that at least partially overlaps a spectrum of the natural light 112 received from the light source 114. Further, an emission spectrum of the long-lasting phosphorescent material may include at least a portion of the visible spectrum, e.g., about 390 to about 750 nanometers (nm).

In some embodiments, the lighting units 104 are removably coupled to the light collector 102 via sockets 10 and are portable. For example, each lighting unit 104 may include a removable coupler 116 having a mechanical interface that is complementary to a mechanical interface of the sockets 108. Each removable coupler 116 may include, for example, a removable fiber optic connector terminating an optical waveguide 118 included in each of the lighting units 104. In these and other embodiments, the lighting units 104 may store energy from natural light 112 during the day time while connected to light collector 102 via sockets 108, optical waveguides 110 and light distributor 106. Then, during night time, the lighting units 104 may be unplugged (disconnected) from the sockets 108 and moved to a desired location to provide portable illumination. Alternately or additionally, the lighting units 104 may remain plugged into sockets 108 and provide illumination from wherever they may be located.

The light distributor 106 is configured to distribute light collected from the light collector 102 between a multiple number of lighting units 104. In these and other embodiments, the light distributor 106 may include one or more beam splitters.

The sockets 108 couple the lighting units 104 to the light collector 102. Each of the sockets 108 may be configured to removably receive a removable coupler 116 of a corresponding lighting unit 104. In some embodiments, each socket 108 may be installed in a wall or other convenient location of a house, building or other structure in which the system 100 is implemented.

The optical waveguides 110 may optically couple the light collector 102 to the light distributor 106, and the light distributor 106 to the lighting units 104. In some embodiments, the optical waveguides 110 of the system 100 and the optical waveguides 118 of the lighting units 104 each include a core surrounded by a cladding layer where a refractive index of the core is greater than that of the cladding layer. Accordingly, the optical waveguides 110 may be implemented as optical fibers in some embodiments. Further, the optical waveguides 110 may be installed in walls or other locations of a house or other building according to some embodiments.

Figure 2:
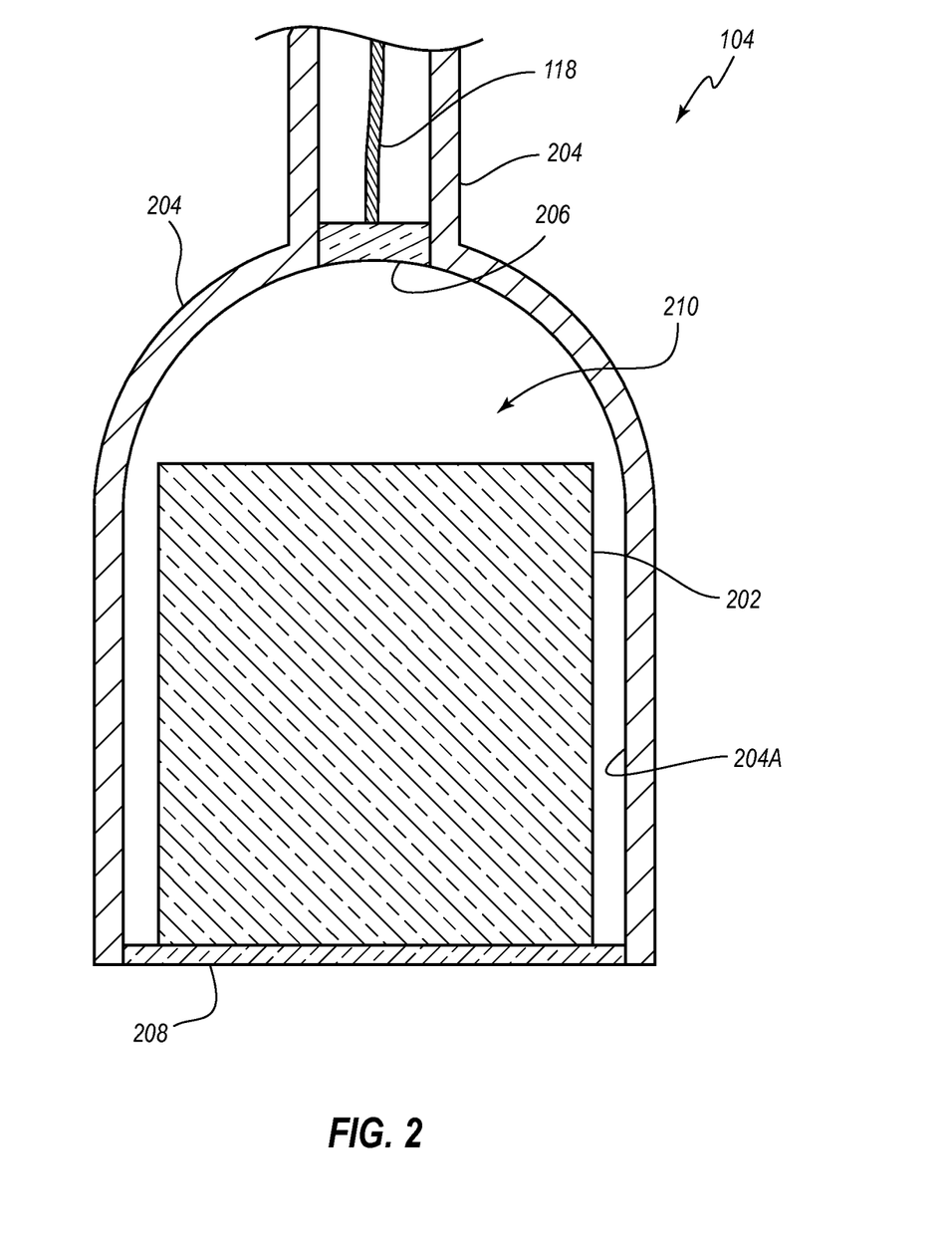
FIG. 2 shows an illustrative example of a cross-sectional view along cutting plane line 2 in FIG. 1 of a lighting unit that may be included in the example system of FIG. 1.

FIG. 2 shows an illustrative example of a cross-sectional view along cutting plane line 2 in FIG. 1 of the lighting unit 104 that may be included in the system 100 of FIG. 1, arranged in accordance with at least some embodiments described herein. The lighting unit 104 includes at least an assembly 202. As will be described in greater detail below, the assembly 202 may include a long-lasting phosphorescent material dispersed throughout a multiple number of bound light-conductive members. Alternately or additionally, the lighting unit 104 may further include the optical waveguide 118, a housing 204, a diverging lens 206 and a transmissive cover 208.

In the illustrated embodiment, the housing 204 surrounds the assembly 202, the optical waveguide 118 and the diverging lens 206 and may be configured to protect the foregoing components from being damaged. The housing 204 may include metal, plastic, wood, or other suitable material(s).

The housing 204 includes an inside surface 204A surrounding the assembly 202. The inside surface 204A may be coated with a material having a relatively high reflectance for wavelengths within an emission spectrum of the lighting unit 104. The emission spectrum of the lighting unit 104 includes one or emission spectra of the components of the lighting unit 104, various examples of which may be provided below.

The coating material on the inside surface 204A may have a reflectance of at least 70%, or a reflectance of at least 85%, or a reflectance of at least 90% for wavelengths within an emission spectrum of the lighting unit 104. Alternately or additionally, the coating material on the inside surface 204A may include aluminum, tin, silver, or other suitable material(s).

The diverging lens 206 may be positioned in an opening of a cavity 210 defined by the housing 204 and may be coupled to an end of the optical waveguide 118. In some embodiments, light traveling in the optical waveguide 118 towards the cavity 210 may be diffused into the cavity 210 by the diverging lens 206. The diffused light may then be received into the assembly 202, stored as energy, and subsequently emitted as light. The cavity 210 may be made as large or as small as desired or can be omitted altogether (not shown) in some embodiments. Alternately or additionally, the diverging lens 206 may extend into and/or substantially fill the cavity 210 and be coupled to the upper end of the assembly 202.

The transmissive cover 208 is coupled to the housing 204. The transmissive cover 208 may be configured to protect the assembly 202 while permitting light emitted by the assembly 202 to pass therethrough. In these and other embodiments, the transmissive cover 208 may include glass, transparent polymer, poly(methyl methacrylate), polysiloxane, acrylic resin, polycarbonate, fluorocarbon polymers, Cyclic Olefin Copolymer ("COC"), or other suitable optically transparent material(s).

Figure 3:
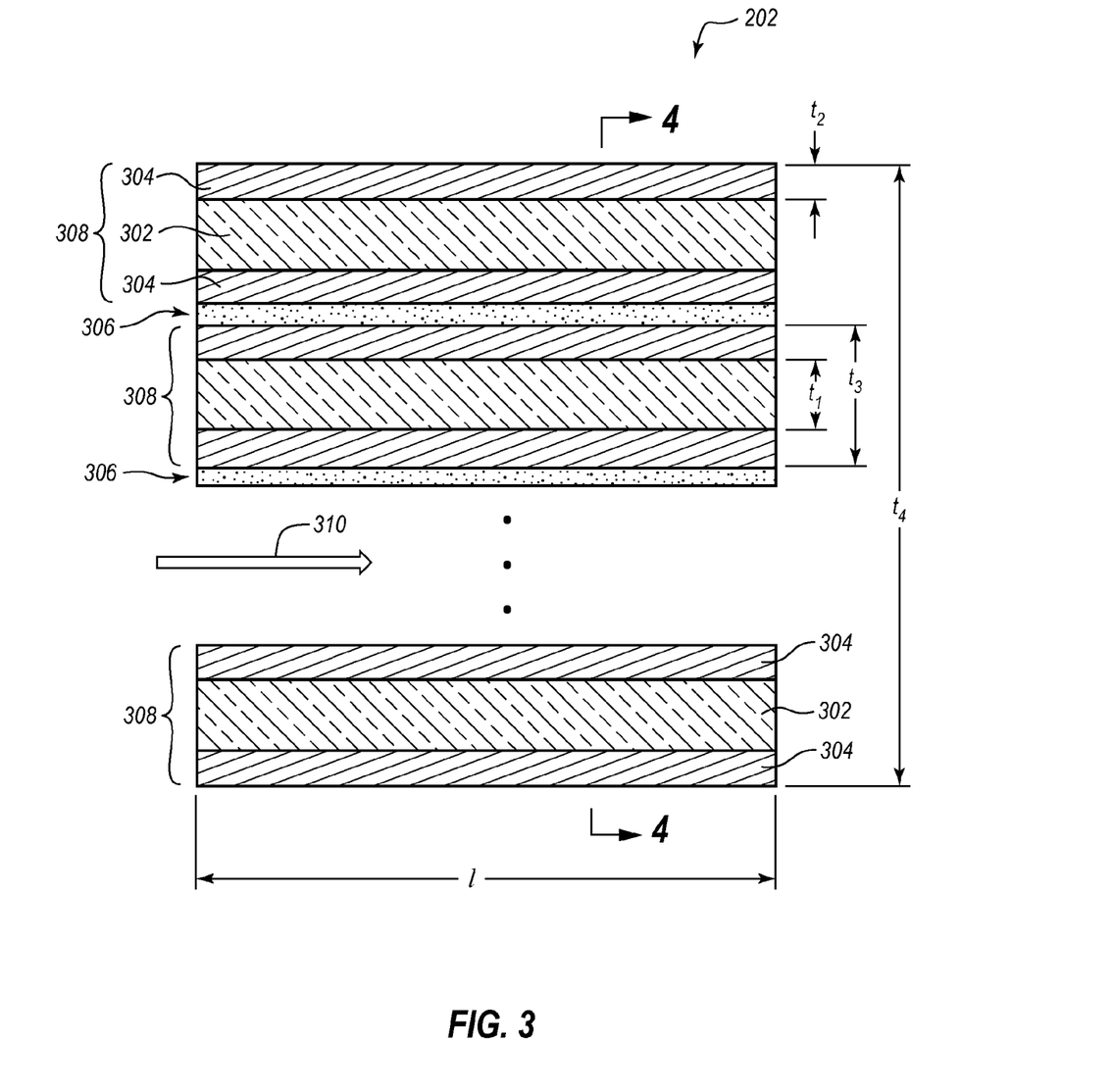
FIG. 3 shows an illustrative example of a cross-sectional view of an assembly that may be included in the lighting unit of FIG. 2.

FIG. 3 shows an illustrative example of a cross-sectional view of the assembly 202 that may be included in the lighting unit 104 of FIG. 2, arranged in accordance with at least some embodiments described herein. In the illustrated embodiment, the assembly 202 includes a multiple number of light-conductive members 302 and a long-lasting phosphorescent material 304 dispersed between the light-conductive members 302.

A luminance of the assembly 202, e.g., after storing sufficient energy from natural light 112, may be at least several thousand candela per square meter ($cd/m^2$). For instance, the luminance of the assembly 202 may be at least 3,000 $cd/m^2$, or about 4,000 $cd/m^2$ in some embodiments.

Optionally, the light-conductive members 302 may be bound in the assembly 202 and thus may be referred to as bound light-conductive members 302. Alternately or additionally, the light-conductive members 302 may be bound by an adhesive 306. The adhesive 306 may include light-polymerizing adhesive, thermosetting resin, thermoplastic resin, or other suitable material(s). More particularly, the adhesive 306 may include one or more of acryl, epoxy, urethane, siloxane, or other suitable material(s).

Each of the light-conductive members 302 may be substantially transparent to optical rays having wavelengths within one or more predetermined wavelength ranges. For example, the light-conductive members 302 may have an optical transmittance of greater than about 85%, or greater than about 90%, or greater than about 95% with respect to at least the predetermined wavelength range. The predetermined wavelength range may include the visible spectrum, e.g., about 300 nanometers ("nm") to about 750 nm. Alternately or additionally, the predetermined wavelength range may include a sub-range of the visible spectrum.

Each of the light-conductive members 302 may include one or more of glass, transparent polymer, poly(methyl methacrylate), polysiloxane, acrylic resin, polycarbonate, fluorocarbon polymers, Cyclic Olefin Polymer ("COP"), or other suitable optically transparent material(s). Alternately or additionally, each of the light-conductive members 302 may include a fluorescent material having an excitation spectrum that overlaps an emission spectrum of the long-lasting phosphorescent material 304. For instance, each of light-conductive members 302 may include dye-doped polystyrene as described in M. Saito and K. Yamamoto, "Bright afterglow illuminator made of phosphorescent material and fluorescent fibers," Applied Optics, Vol. 39, No. 24, pp. 4366-4371, Aug. 20, 2000 (hereinafter the "Saito article"), which is herein incorporated by reference in its entirety.

Each of the light-conductive members 302 may have a thickness $t_1$ in a range between about 3 micrometers ("µm") and about 30 µm, or in a range between about 4 µm and about 25 µm, or in a range between about 5 µm and about 20 µm.

The long-lasting phosphorescent material 304 may generally include a phosphorescent material having an excitation spectrum that at least partially overlaps the spectrum of the natural light 112 (FIG. 1) and an emission spectrum that at least partially overlaps the visible spectrum or other predetermined wavelength range. In some embodiments, the spectrum of the natural light 112 may include the visible spectrum such that both of the excitation and emission spectra of the long-lasting phosphorescent material 304 may at least partially overlap the visible spectrum.

The excitation and emission spectra of the long-lasting phosphorescent material 304 may depend on a composition of the long-lasting phosphorescent material 304. For instance, the long-lasting phosphorescent material 304 may include a doped oxide, such as, but not limited to, Eu-doped $SrAl_2O_4$, Dy-doped $SrAl_2O_4$, Eu-doped $CaAl_2O_4$, Nd-doped $CaAl_2O_4$, Eu-doped $Sr_4Al_{14}O_{25}$, Dy-doped $Sr_4Al_{14}O_{25}$, or combinations thereof, or other suitable material(s). Each oxide and doping agent combination may include particular excitation and emission spectra that may be different than the excitation and emission spectra of other combinations. In some embodiments, however, the excitation spectrum of the long-lasting phosphorescent material 304 may include a range from about 200 nm to about 600 nm, or a range from about 380 nm to about 780 nm. Alternately or additionally, the emission spectrum of the long-lasting phosphorescent material 304 may include a range from about 380 nm to about 560 nm, or a range from about 480 nm to about 650 nm, or a range from about 550 nm to about 750 nm.

The long-lasting phosphorescent material 304 may have a time constant defined as an amount of time in which the intensity of light emitted by the long-lasting phosphorescent material 304 decays from an initial value to 1/e of the initial value. The time constant may be fixed or variable in time as the light intensity decays. According to some embodiments, the time constant may be somewhere in a range from on the order of tens of minutes to on the order of hundreds of minutes.

The long-lasting phosphorescent material 304 may be provided in layers of long-lasting phosphorescent particles on opposing sides of each light-conductive member 302 as shown in FIG. 3. Alternately or additionally, each of the layers of long-lasting phosphorescent material 304 may have a thickness $t_2$ that in general may be more than one particle thick. In some embodiments, the thickness $t_2$ may be between about 5 µm and about 20 µm, or between about 7 µm and about 18 µm, or between about 10 µm and about 15 µm.

In the illustrated embodiment, each of the light-conductive members 302 and adjacent layers of long-lasting phosphorescent material 304 may form respective combined layers 308. Each of the combined layers 308 may have a thickness $t_3$ between about 10 µm and about 30 µm, or between about 12 µm and about 28 µm, or between about 15 µm and about 25 µm.

Alternately or additionally, a luminance of each of the combined layers 308, after storing sufficient energy from natural light 112 (FIG. 1), may be at least several hundred millicandela per square meter ($mcd/m^2$). For instance, the luminance of each combined layer 308 individually may be at least about 300 $mcd/m^2$, or about 400 $mcd/m^2$ in some embodiments.

Although only three combined layers 308 are depicted in FIG. 3, in general the assembly 202 may include virtually any number of combined layers 308. In some embodiments, the assembly 202 may include up to $10^4$ combined layers 308, or even more than $10^4$ combined layers 308. In these and other embodiments, the assembly 202, including the combined layers 308 in aggregate, may have a thickness $t_4$ between about 3 centimeters ("cm") and about 30 cm, or between about 5 cm and about 25 cm, or between about 10 cm and about 20 cm.

Alternately or additionally, the assembly 202 may have a length/between about 3 centimeters ("cm") and about 30 cm, or between about 5 cm and about 25 cm, or between about 10 cm and about 20 cm.

FIG. 3 further includes an arrow 310 depicting a general direction of travel of both incoming natural light and outgoing emitted light through the assembly 202.

Figure 4A:
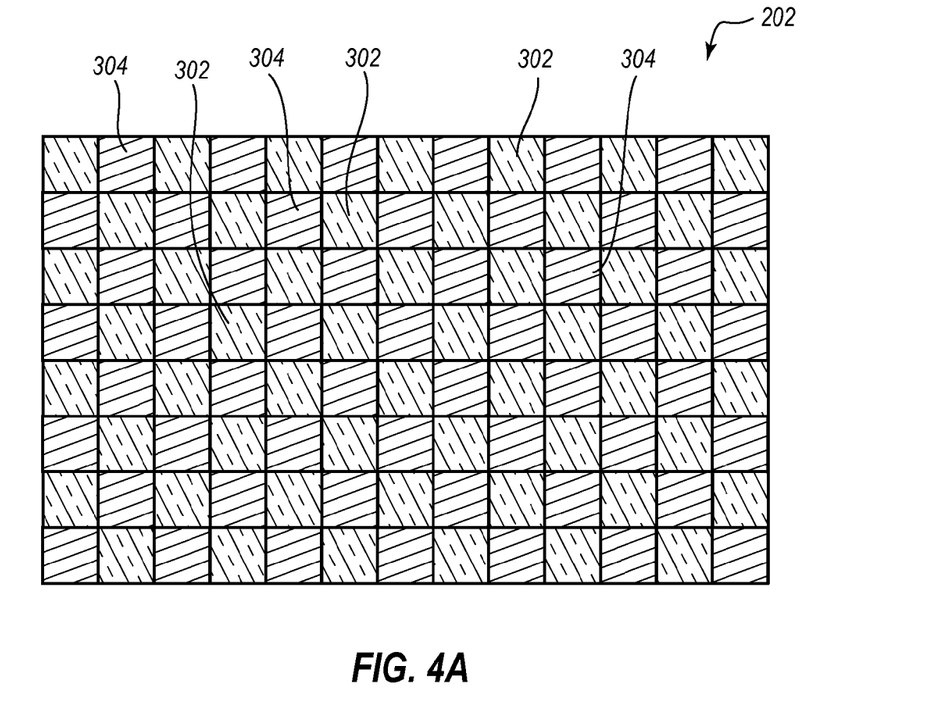
FIG. 4A shows an illustrative example of a cross-sectional view of the assembly of FIG. 3 along cutting plane line 4 in FIG. 3.

FIG. 4A shows an illustrative example of a cross-sectional view of the assembly 202 of FIG. 3 along cutting plane line 4 in FIG. 3, arranged in accordance with at least some embodiments described herein. The cross-sectional view of FIG. 4A may be in a substantially normal orientation with respect to the arrow 310 of FIG. 3 depicting the general direction of travel of both incoming natural light and outgoing emitted light. In the example of FIG. 4A, each of the light-conductive members 302 may be configured as a light-conductive fiber.

Figure 4B:
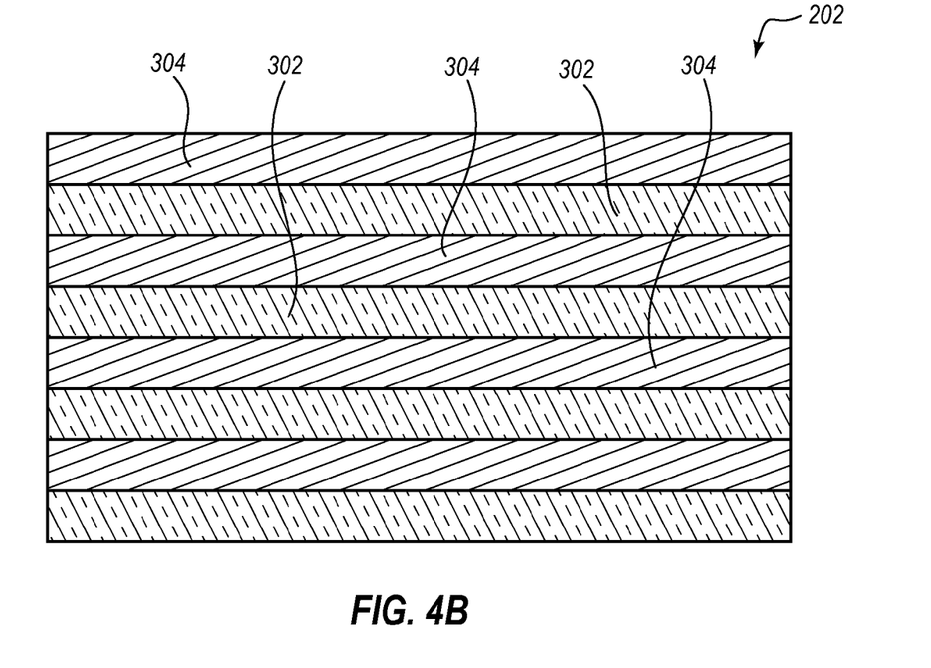
FIG. 4B shows another illustrative example of a cross-sectional view of the assembly of FIG. 3 along cutting plane line 4 in FIG. 3.

FIG. 4B shows another illustrative example of a cross-sectional view of the assembly 202 of FIG. 3 along cutting plane line 4 in FIG. 3, arranged in accordance with at least some embodiments described herein. The cross-sectional view of FIG. 4B may be in a substantially normal orientation with respect to the arrow 310 of FIG. 3 depicting the general direction of travel of both incoming natural light and outgoing emitted light. In the example of FIG. 4B, each of the light-conductive members 302 may be configured as a light-conductive sheet.

It will be appreciated, with the benefit of the present disclosure, that while the adhesive layer 306 (FIG. 3) is not depicted in FIGS. 4A-4B, an adhesive layer may nevertheless be included in the assembly 202 of FIGS. 4A-4B. For instance, each of the layers of long-lasting phosphorescent material 304 illustrated in FIGS. 4A-4B may include two adjacent layers of long-lasting phosphorescent material 304 coupled together by an adhesive layer 306 as illustrated in FIG. 3.

Figure 5:
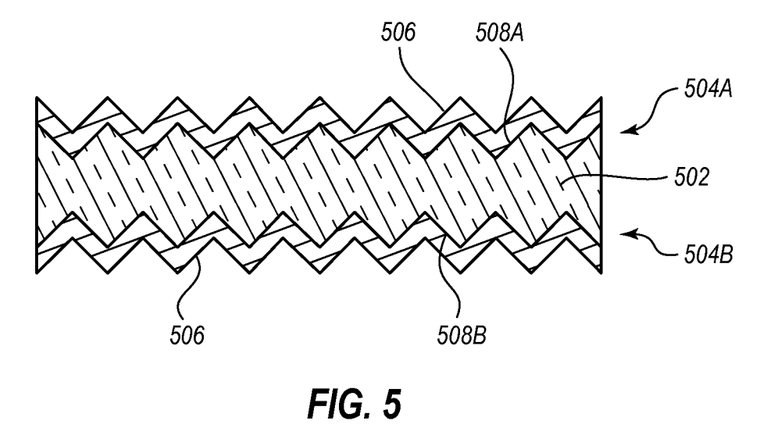
FIG. 5 shows an illustrative example of a cross-sectional view of a light-conductive member that may be included in the assembly of FIG. 3.

FIG. 5 shows an illustrative example of a cross-sectional view of a light-conductive member 502 that may be included in the assembly 202 of FIG. 3, arranged in accordance with at least some embodiments described herein. The light-conductive member 502 may correspond to the light-conductive members 302 of FIG. 3. Further, the light-conductive member 502 is coated on opposing sides 504A, 504B by a long-lasting phosphorescent material 506. The long-lasting phosphorescent material 506 may correspond to the long-lasting phosphorescent material 304 of FIG. 3.

In some embodiments, the light-conductive member 502 may include a textured surface 508A formed on at least one side 504A of the light-conductive member 502. In the illustrated embodiment, the light-conductive member 502 includes textured surfaces 508A, 508B formed on the opposing sides 504A, 504B of the light-conductive member 502. The textured surfaces 508A, 508B may include steps, as shown in FIG. 5, or other shapes including, but not limited to, rounded steps, pyramids, cones, or the like or any combination thereof.

It will be appreciated, with the benefit of the present disclosure, that a light-conductive member including textured surfaces, such as textured surfaces 508A, 508B, may have greater surface area than an otherwise similarly configured light-conductive member lacking textured surfaces. Accordingly, a relatively greater amount of long-lasting phosphorescent material, such as long-lasting phosphorescent material 506, may be deposited on a light-conductive member having textured surfaces than on a light-conductive member lacking textured surfaces, which may result in relatively greater energy storage capacity per unit volume and/or relatively greater luminance per unit volume in a light-conductive member having textured surfaces than in a light-conductive member lacking textured surfaces.

Figure 6:
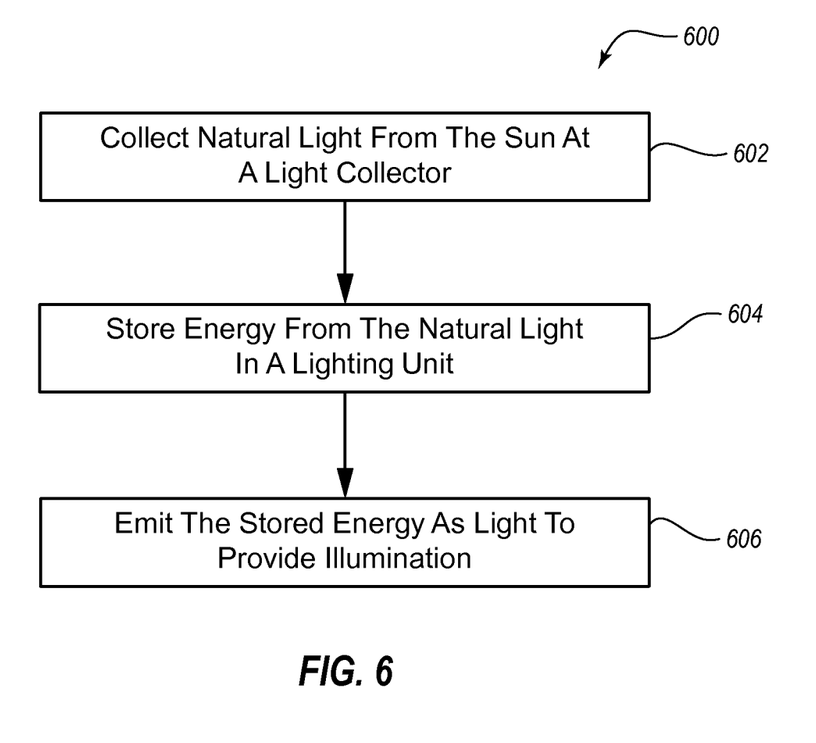
FIG. 6 shows an example flow diagram of a method for storing and re-using energy of natural light.

FIG. 6 shows an example flow diagram of a method 600 for storing and re-using energy of natural light, arranged in accordance with at least some embodiments described herein. The method 600 may be performed, in some embodiments, by the system 100 of FIG. 1. The method 600 includes various operations, functions or actions as illustrated by one or more of blocks 602, 604 and 606. The method 600 may begin at block 602.

In block 602, natural light is collected from the sun at a light collector. In some embodiments, collecting the natural light from the sun at the light collector may include, at the light collector, focusing natural light through a lens array into an optical waveguide coupled between the light collector and a lighting unit. Block 602 may be followed by block 604.

In block 604, energy from the natural light is stored in a lighting unit optically coupled to the light collector. The lighting unit may be configured as described hereinabove with respect to FIGS. 1-5. Accordingly, storing energy from the natural light in the lighting unit may include exciting, by the natural light, a long-lasting phosphorescent material dispersed throughout the lighting unit, such as the long-lasting phosphorescent material 304. Alternately or additionally, the lighting unit may be portable and may be removably coupled to the light collector through a socket. Moreover, energy from the natural light may be stored in the lighting unit during day time. Block 604 may be followed by block 606.

In block 606, the stored energy in the lighting unit may be emitted as light to provide illumination. In some embodiments, emitting the stored energy as light may include emitting, by the long-lasting phosphorescent material dispersed throughout the lighting unit, one or more photons in response to the long-lasting phosphorescent material transitioning from an excited energy state to an energy state with relatively lower energy.

Although not shown in FIG. 6, the method 600 may optionally include detaching the lighting unit including stored energy from a socket and a light collector at night time and moving the detached lighting unit to a desired location to provide illumination during night time.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
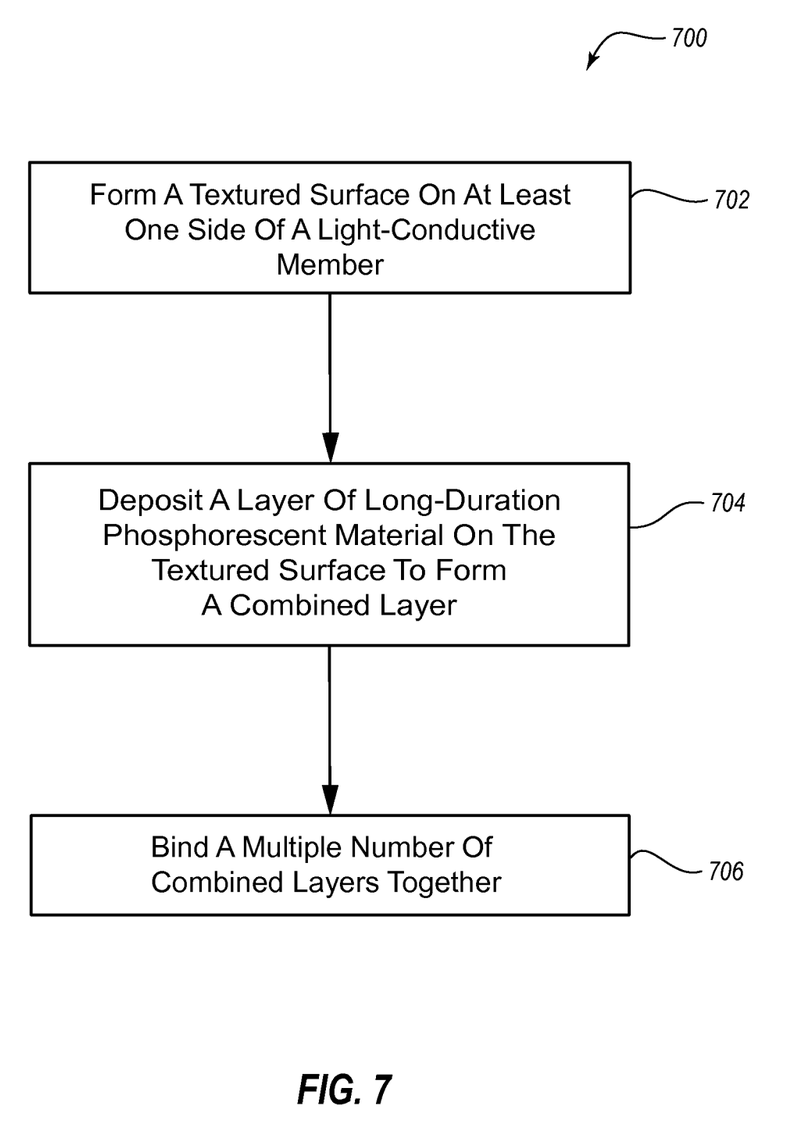
FIG. 7 shows an example flow diagram of a method of forming a lighting unit.

FIG. 7 shows an example flow diagram of a method 700 of forming a lighting unit, arranged in accordance with at least some embodiments described herein. The lighting unit formed according to the method 700 may be configured as described above with respect to FIGS. 1-5, for instance. The method 700 includes various operations, functions or actions as illustrated by one or more of blocks 702, 704 and 706. The method 700 may begin at block 702.

In block 702, a textured surface is formed on at least one side of a light-conductive member. The textured surface may be a stepped surface in some embodiments, such as the stepped surface 508A of FIG. 5. The specific process used to form the textured surface may depend on, for example, the composition of the light-conductive member. Accordingly, forming the textured surface on the at least one side of the light-conductive member may include, depending on the composition of the light-conductive member, imprint molding the textured surface on the at least one side of the light-conductive member, form molding the textured surface on the at least one side of the light-conductive member, emboss molding the textured surface on the at least one side of the light-conductive member, or other suitable process. Block 702 may be followed by block 704.

In block 704, a layer of long-lasting phosphorescent material is deposited on the textured surface to form a combined layer including the layer of long-lasting phosphorescent material and the light-conductive member. The specific process used to deposit the layer of long-lasting phosphorescent material may depend on, for example, the composition of the light-conductive member. In some embodiments, the specific process used to deposit the long-lasting phosphorescent material on the textured surface may include one or more of plating, chemical solution deposition, chemical vapor deposition ("CVD"), plasma-enhanced chemical vapor deposition (PECVD), sputtering, reactive sputtering, or other suitable process(es). Block 704 may be followed by block 706.

In block 706, a multiple number of combined layers are bound together. In some embodiments, the light-conductive member included in each of the combined layers includes a light-conductive sheet. In these and other embodiments, up to $10^4$ or more combined layers may be bound together. Alternatively or additionally, the light-conductive member included in each of the combined layers may include a light-conductive fiber. In these and other embodiments, up to $10^8$ or more combined layers may be bound together.

According to some embodiments, binding a multiple number of combined layers together may include bundling the multiple number of combined layers together and providing an adhesive between the bundled combined layers. In these and other embodiments, and although not shown, the method 700 may further include setting the adhesive. For adhesive including light-polymerizing adhesive, setting the adhesive may include exposing the adhesive to electromagnetic radiation having a wavelength spectrum that at least partially overlaps a particular wavelength spectrum configured to polymerize the adhesive. For adhesive including thermosetting resin, setting the adhesive may include irreversibly curing the adhesive by heating the adhesive above a first predetermined temperature. For adhesive including thermoplastic resin, setting the adhesive may include hot pressing the bundled combined layers and adhesive.

Figure 8:
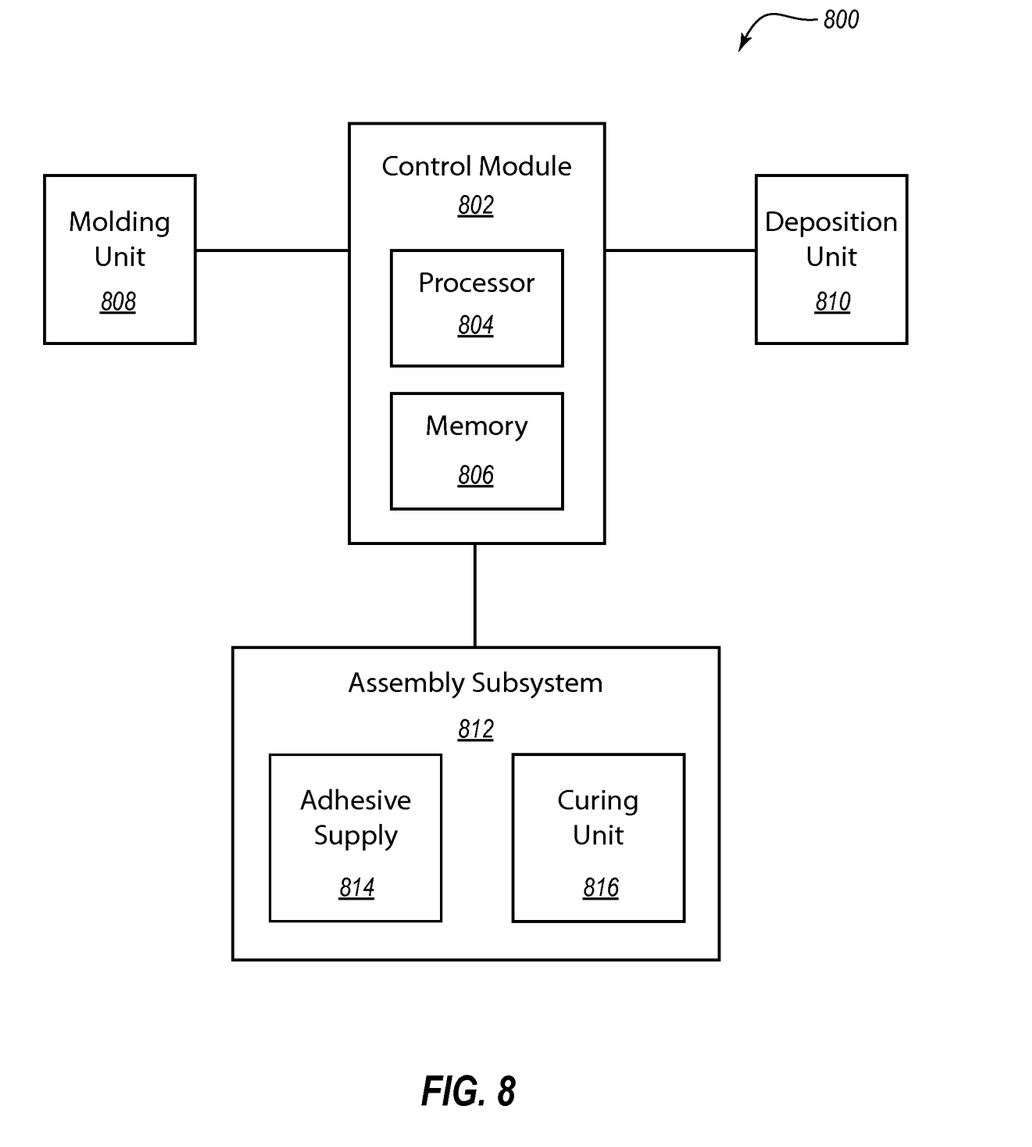
FIG. 8 is a block diagram of an illustrative embodiment of a system suitable to form a lighting unit, all arranged according to at least some embodiments described herein.

FIG. 8 is a block diagram of an illustrative embodiment of a system 800 suitable to form a lighting unit, such as the lighting unit 104 of FIG. 1, arranged in accordance with at least some embodiments described herein. FIG. 8 illustrates that some or all of the components for forming a lighting unit can be controlled automatically. A control module 802 may use a processor 804 to execute computer-executable instructions stored in a memory 806. The control module 802 can be coupled to one or more of a molding unit 808, a deposition unit 810, and an assembly subsystem 812.

The control module 802 may be configured to control one or more of the components 808, 810, 812, or portions thereof, to perform one or more of the functions or actions set forth below in an automated or semi-automated manner.

The molding unit 808 may be configured to form a textured surface on at least one side of a light-conductive member. The molding unit 808 may include, for instance, an imprint molder, a form mold, or an embossing molder, depending on the composition of the light-conductive member.

The deposition unit 810 may be configured to deposit a layer of long-lasting phosphorescent material on the textured surface(s) of the light-conductive member to form a combined layer. The deposition unit 810 may be configured to provide plating, chemical solution deposition, CVD, PECVD, sputtering, reactive sputtering, or other suitable process(es).

The assembly subsystem 812 may be configured to bind multiple combined layers together to form an assembly, such as the assembly 202 of FIG. 2, for use in a lighting unit, such as the lighting unit 104 of FIG. 1. In some embodiments, the assembly subsystem 812 may include, among other things, an adhesive supply 814 and a curing unit 816. The adhesive supply 814 may be configured to supply light-polymerizing adhesive, thermosetting resin, thermoplastic resin, or other suitable adhesive for binding multiple combined layers together. The curing unit 816 may be configured to provide heat, electromagnetic radiation, or other catalyst configured to set the adhesive.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A lighting unit, comprising:
   a housing with a cavity extending from a waveguide at a first end to a light outlet at a second end;
   a lighting assembly located in the cavity, the lighting assembly comprising:
      a plurality of bound light-conductive cores extending between the waveguide and light outlet; and
      a phosphorescent material dispersed between and contacting the plurality of bound light-conductive cores; and
   a diverging lens positioned in the housing between the first end and the lighting assembly,
   wherein a luminance of the lighting unit is at least several thousand candela per square meter (cd/m2).

2. The lighting unit of claim 1, wherein each of the plurality of bound light conductive cores comprises a transparent polymer, poly(methyl methacrylate), polysiloxane, glass, acrylic resin, polycarbonate, fluorocarbon polymers, or Cyclic Olefin Polymer ("COP").

3. The lighting unit of claim 1, wherein the phosphorescent material comprises at least one of: Eu-doped $SrAl_2O_4$, Dy-doped $SrAl_2O_4$, Eu-doped $CaAl_2O_4$, Nd-doped $CaAl_2O_4$, Eu-doped $Sr_4Al_{14}O_{25}$, Dy-doped $Sr_4Al_{14}O_{25}$, or combinations thereof.

4. The lighting unit of claim 1, wherein each of the plurality of bound light-conductive cores comprises a fluorescent material having an excitation spectrum that overlaps an emission spectrum of the phosphorescent material.

5. The lighting unit of claim 1, wherein the phosphorescent material comprises phosphorescent particles, further wherein each of the plurality of bound light-conductive cores is coated on opposing sides by respective layers of phosphorescent material, each of the respective layers being more than one particle thick.

6. The lighting unit of claim 1, wherein at least one layer of the phosphorescent material is disposed between the plurality of bound light-conductive cores, the at least one layer of the phosphorescent material and the plurality of bound light-conductive cores oriented in a single plane.

7. The lighting unit of claim 1, wherein the plurality of bound light-conductive cores is bound by an adhesive comprising a light-polymerizing adhesive or a thermosetting resin.

8. The lighting unit of claim 1, wherein each of the plurality of bound light-conductive cores includes a textured surface and the phosphorescent material is positioned on the textured surface of each of the plurality of bound light-conductive cores.

9. A method of forming a lighting unit, comprising:
   forming a textured surface on at least one side of a light-conductive core;
   depositing a layer of phosphorescent material on the textured surface of the light-conductive core to form a combined layer;
   binding a plurality of combined layers together to form a lighting assembly; and
   locating the lighting assembly in a cavity of a housing, the housing having the cavity extending from a waveguide at a first end to a light outlet at a second end, wherein a diverging lens is positioned in the housing between the first end and the lighting assembly.

10. The method of claim 9, wherein binding the plurality of combined layers together includes bundling the plurality of combined layers together and providing an adhesive between the bundled combined layers.

11. The method of claim 9, wherein a collective luminance of the bound plurality of combined layers is at least several thousand candela per square meter ($cd/m^2$).

12. The method of claim 11, wherein the collective luminance of the bound plurality of combined layers is about four thousand candela per square meter ($cd/m^2$).

13. A system for storing and re-using the energy of natural light, comprising:
   a light collector; and
   a lighting unit according to claim 1, wherein the lighting unit is optically coupled to the light collector.

14. The system of claim 13, further comprising:
   a plurality of lighting units optically coupled to the light collector; and a light distributor configured to distribute light from a single light collector between the plurality of lighting units.

15. The system of claim 14, further comprising a plurality of optical waveguides optically coupling the light collector to the light distributor and the light distributor to the plurality of lighting units.

16. The system of claim 13, wherein a reflectance of a material coating an inside surface of the cavity of the housing having the lighting unit is at least 85% for wavelengths within the emission spectrum of the lighting unit.

17. The system of claim 13, wherein the lighting unit is configured to store energy from light collected by the light collector and is further configured to emit stored energy as light.

18. The system of claim 17, wherein the lighting unit is removably coupled to the light collector and is portable such that the lighting unit is configured to provide portable illumination.

19. A method for storing and re-using energy of natural light comprising:
    collecting natural light from the sun at a light collector;
    storing energy from the natural light in a lighting unit optically coupled to the light collector, the lighting unit comprising;
        a housing with a cavity extending from a waveguide at a first end to a light outlet at a second end;
        a lighting assembly located in the cavity, the lighting assembly comprising:
            a plurality of bound-light conductive cores extending between the waveguide and light outlet;
            a phosphorescent material dispersed between and contacting the plurality of light-conductive cores; and
            a diverging lens positioned in the housing between the first end and the lighting assembly; and
    emitting the stored energy as light to provide illumination.

20. The method of claim 19, wherein storing energy from the natural light in the lighting unit includes exciting, by the natural light, the phosphorescent material dispersed throughout the lighting unit.

21. The method of claim 20, wherein emitting the stored energy as light includes the phosphorescent material emitting one or more photons in response to the phosphorescent material transitioning from an excited energy state to an energy state with relatively lower energy.

* * * * *

UNITED STATES PATENT AND TRADEMARK OFFICE
CERTIFICATE OF CORRECTION

PATENT NO. : 8,831,392 B2  
APPLICATION NO. : 13/320733  
DATED : September 9, 2014  
INVENTOR(S) : Fukui

It is certified that error appears in the above-identified patent and that said Letters Patent is hereby corrected as shown below:

In the Specification

In Column 1, Line 2, below Title,
insert -- CROSS-REFERENCE TO RELATED APPLICATION
The present application is a U.S national stage application claiming the benefit of national Application No. PCT/US11/038439, filed on May 27, 2011, the entire contents of which are incorporated herein by reference. --.

In Column 7, Line 2, delete "length/between" and insert -- length 1 between --, therefor.

Signed and Sealed this
Twenty-fourth Day of March, 2015

Michelle K. Lee
*Director of the United States Patent and Trademark Office*